United States Patent Office 2,712,799
Patented July 12, 1955

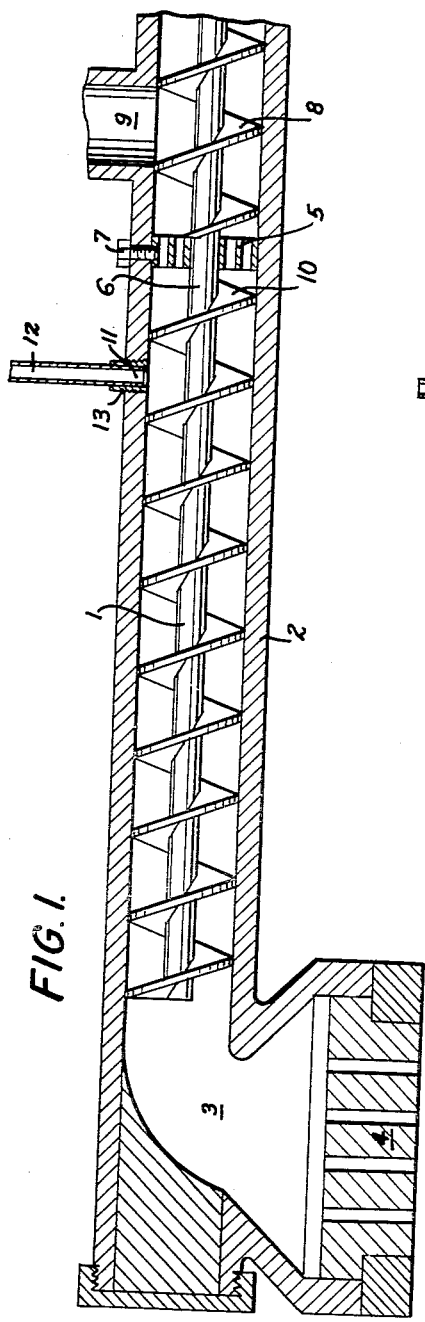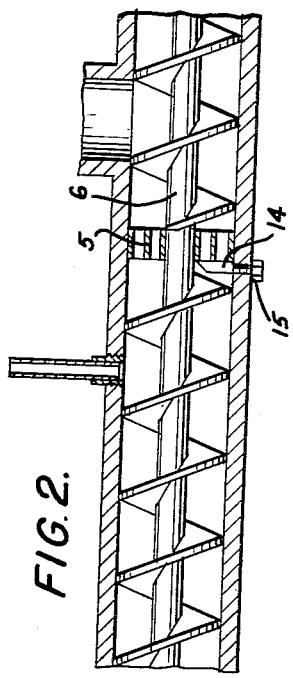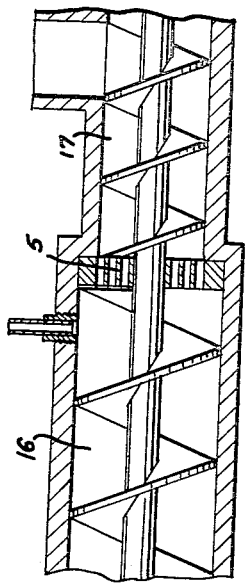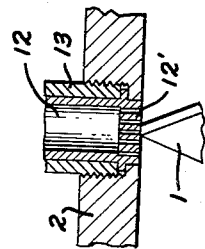

2,712,799
APPARATUS FOR TREATING ALIMENTARY PASTES AND THE LIKE

Mario Braibanti and Giuseppe Braibanti, Milan, Italy

Application April 1, 1953, Serial No. 346,134

Claims priority, application Italy February 21, 1953

18 Claims. (Cl. 107—14)

The present invention relates to apparatus for treating alimentary pastes which are made into vermicelli, macaroni, spaghetti, or the like.

More particularly, the present invention relates to worm screw operated machines which press the paste through properly shaped plates for forming the paste into elongated cord-like portions. It is known that the properties of the product, such as the consistency of the cords of paste, are greatly improved if the mass of paste is placed in a partial vacuum before being pressed into the cord-like portions. At the present time, the known devices for producing this partial vacuum are extremely complicated and expensive.

One of the objects of the present invention is to overcome these drawbacks by providing an exceedingly simple and inexpensive arrangement for providing such a vacuum.

A further object of the present invention is to provide a means whereby the paste itself forms a sealing medium for sealing the vacuum chamber.

Another object of the present invention is to provide a means for breaking the paste into small pieces when it enters the vacuum chamber.

An additional object of the present invention is to provide a vacuum chamber which is great enough to efficiently subject the paste passing therethrough to the vacuum.

With the above objects in view, the present invention mainly consists of an apparatus for treating alimentary pastes and the like, this apparatus including a housing having an inlet and an outlet for feeding an alimentary paste respectively into and out of the housing, this housing having an elongated tubular portion located between its inlet and outlet. A plate means covers the outlet of the housing for converting a paste passing through the plate means into elongated cord-like portions, the paste together with the plate means serving to close the outlet of the housing. A worm screw is turnably mounted in the tubular portion of the housing and extends from the inlet toward the outlet for feeding a paste from the inlet to the outlet of the housing. A perforated disc is located in the tubular portion of the housing about the worm screw between the inlet and outlet of the housing and extends across the interior of the tubular portion of the housing so that the worm screw feeds paste from the inlet through the perforations of the disc toward the outlet of the housing, the paste together with the disc serving to close off a portion of the housing located between the outlet thereof and the disc. A suction means is operatively connected to the housing and communicates with the interior of this portion thereof for producing a partial vacuum therein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional view of one possible apparatus constructed in accordance with the present invention;

Fig. 2 is a fragmentary sectional view through a different embodiment of an apparatus constructed in accordance with the present invention;

Fig. 3 is a fragmentary sectional view through yet another embodiment of an apparatus constructed in accordance with the present invention; and Fig. 4 is a fragmentary, sectional view, on an enlarged scale, of the structure at the joint between a housing and suction tube of the present invention.

Referring now to the drawings, and to Fig. 1 thereof in particular, it will be seen that the apparatus of the present invention includes a housing 2 having an inlet 9 and an outlet 3, the latter being closed by a plate means 4 of any known construction which is adapted to convert paste passing through outlet 3 into elongated cord-like portions. For example, this plate means 4 may comprise a plate formed with a plurality of apertures passing therethrough so that upon passing through the apertures the body of paste becomes converted into elongated cords adapted to be made into spaghetti, macaroni, vermicelli, or the like. The housing 2 is closed at its top left hand portion, as viewed in Fig. 1, by a removable plug or the like.

As is evident from Fig. 1, the housing includes an elongated tubular portion extending from the inlet 9 toward the outlet 3, and a worm screw 1 is mounted for rotation in this tubular portion so as to feed the paste from inlet 9 to outlet 3 and out through the plate means 4. A perforated disc 5 is located about the shank 6 of the worm screw in the tubular portion of the housing and extends across this tubular portion, as shown in Fig. 1, the disc 5 being located adjacent to the inlet 9 between the latter and the outlet 3. In the particular example illustrated in Fig. 1, the disc 5 is removably fixed to the housing, so as to be stationary therewith, through the medium of at least one screw 7 extending through a suitable threaded opening in the housing and extending into an opening formed in the outer periphery of the disc 5.

The thread portion 8 of the worm screw 1 feeds paste from the inlet 9 to the disc 5 and pushes the paste through the perforations of the stationary disc, the latter extending freely about the shank 6 so that the worm screw 1 is freely turnable with respect to the disc 5. Thus, the paste enters the chamber located between the outlet 3 and the disc 5, and it is evident that the paste cooperates with the disc 5 to close off this chamber at the disc 5 and with the plate means 4 to close off the chamber at the outlet 3.

The thread portion 10 of the worm 1 is located adjacent to that side of disc 5 which is directed toward the outlet 3 so as to separate paste from the disc 5 and break this paste into small pieces so that a vacuum produced in the chamber located at the left of disc 5, as viewed in Fig. 1, operates over a large surface area of the paste to produce the best possible results. To produce this vacuum, the tubular portion of housing 2 is formed with an opening 11 in which a sleeve 13 is located, this sleeve being joined to the housing 2 by threads or the like. A suction tube 12 forming a suction means for producing the vacuum in the housing 2 is fixed to the interior of sleeve 13 so as to be connected by the latter to the housing 2, this tube 12 being connected to a blower or other air pump for maintaining a partial vacuum in the chamber extending between outlet 3 and disc 5.

The tube 12 is provided at its free end located in opening 11 with a strainer or the like 12', which may, for example, take the form of a perforated plate located in the tube 12, for preventing paste from passing into the tube 12. This strainer, shown in Fig. 4, has an outer surface forming a continuation of the inner surface of the housing 2, so that the strainer is scraped by the outer periphery of the thread of worm 1 to be cleaned thereby during rotation of the worm.

In this way, a partial vacuum is maintained in the chamber between outlet 3 and disc 5, and the paste itself cooperates with disc 5 and plate means 4 to seal this chamber.

According to the embodiment of the invention illustrated in Fig. 2, the disc 5 is fixed to the worm 1 for rotation therewith so that screws 7 or the like are not needed. A blade means 14 is provided to separate the paste from the side of disc 5 which is directed toward the outlet of housing 2, and this blade means 14 engages this side of disc 5 and is fixed to an end of a screw 15 which extends through a threaded opening of the housing 2 so that the blade means 14 is removable from the housing. Except for these differences, the embodiment of Fig. 2 is identical with that of Fig. 1.

According to the embodiment of the invention which is illustrated in Fig. 3, the tubular portion of the housing is formed adjacent the inlet thereof with a first part 17 which is of a smaller diameter than a second part 16 of the housing, so that the vacuum chamber of the housing is enlarged and capable of handling a large amount of broken up paste fed into the vacuum chamber. As is shown in Fig. 3, the worm screw has a smaller diameter in part 17 than in part 16 of the tubular portion of the housing, and the plate 5 is located in the larger part 16 of the tubular portion of the housing at the place where this larger portion 16 joins the smaller portion 17.

In the particular example illustrated in Fig. 3, the disc 5 is fixed to the housing, so as to be stationary therewith, by a screw means 7 or the like, not shown in Fig. 3, and the shank of the worm screw extends freely through the disc 5 so as to be rotatable with respect to the same. Also, as is evident from Fig. 3, the thread of the worm screw is located adjacent that side of disc 5 which is directed toward the outlet of the housing so that this thread separates the paste passing through the perforations of disc 5 from the latter and breaks the paste up into small pieces to be advantageously acted on by the vacuum.

Except for these features, the embodiment of Fig. 3 is identical with that of Fig. 1. It is to be understood, however, that it is possible in the case of the embodiment of Fig. 3 to fix the disc 5 to the worm screw for rotation therewith and to provide a blade means similar to blade means 14 of Fig. 2 for separating the paste from the disc 5.

It will be understood that each of the elements described above, or two or more together, may also find a useful application in other types of apparatus for treating alimentary pastes and the like differing from the types described above.

While the invention has been illustrated and described as embodied in apparatus for providing a vacuum chamber through which an alimentary paste passes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

2. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to and stationary with said housing and extending freely about said worm screw so that the latter is rotatable with respect to said disc; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

3. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to and stationary with said housing and extending freely about said worm screw so that the latter is rotatable with respect to said disc, and the latter having the side thereof directed toward said outlet of said housing located adjacent to the thread of said worm screw so that paste passing through said disc is separated from the latter and broken up by said thread; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

4. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to said worm screw so as to rotate therewith with respect to said housing; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

5. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to said worm screw so as to rotate therewith with respect to said housing; blade means fixed to said housing, extending into the interior of said tubular portion thereof, and engaging that side of said disc which is directed toward said outlet of said housing so as to separate and break up paste passing through said disc; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

6. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to said worm screw so as to rotate therewith with respect to said housing; blade means removably fixed to said housing, extending into the interior of said tubular portion thereof, and engaging that side of said disc which is directed toward said outlet of said housing so as to separate and break up paste passing through said disc; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

7. Apparatus for treating alimentary pastes and the like comprising, in combination, a housing having an inlet and an outlet for feeding an alimentary paste respectively into and out of said housing, the latter having an elongated tubular portion located between said inlet and outlet, said tubular portion having a first part located adjacent said inlet which is of a smaller diameter than a second part of said tubular portion located between said first part thereof and said outlet; plate means covering said outlet of said housing for converting a paste passing through said plate means into elongated cord-like portions, said paste together with said plate means serving to close said outlet of said housing, said worm screw having a helical edge of an outside diameter substantially equal to the inside diameter of said portion; a worm screw turnably mounted in said tubular portion of said housing and extending from said inlet toward said outlet for feeding a paste from said inlet to said outlet of said housing; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

8. Apparatus for treating alimentary pastes and the like comprising, in combination, a housing having an inlet and an outlet for feeding an alimentary paste respectively into and out of said housing, the latter having an elongated tubular portion located between said inlet and outlet, said tubular portion having a first part located adjacent said inlet which is of a smaller diameter than a second part of said tubular portion located between said first part thereof and said outlet; plate means covering said outlet of said housing for converting a paste passing through said plate means into elongated cord-like portions said paste together with said plate means serving to close said outlet of said housing; a worm screw turnably mounted in said tubular portion of said housing and extending from said inlet toward said outlet for feeding a paste from said inlet to said outlet of said housing, said worm screw having in said second part of said tubular portion a helical edge of an outside diameter larger than in said first part of said tubular portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc; conduit means having one end connected to said housing in communication with the interior of said second part of said portion thereof and being adapted to be connected to a suction means whereby a partial vacuum may be produced in said second part of said portion; and screening means disposed at said end of said conduit means for blocking the passage of paste from said second part of said portion into said conduit means, said screening means being substantially flush with the inside surface of said second part of said portion so that as said worm screw rotates said helical edge thereof in said second part of said portion means cleans said screening means.

9. Apparatus for treating alimentary pastes and the like comprising, in combination, a housing having an inlet and an outlet for feeding an alimentary paste respectively into and out of said housing, the latter having an elongated tubular portion located between said inlet and outlet, said tubular portion having a first part located adjacent said inlet which is of a smaller diameter than a second part of said tubular portion located between said first part thereof and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being located at the place where said first part of said tubular portion joins said second part thereof; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

10. Apparatus for treating alimentary pastes and the like comprising, in combination, a housing having an inlet and an outlet for feeding an alimentary paste respectively into and out of said housing, the latter having an elongated tubular portion located between said inlet and outlet, said tubular portion having a first part located adjacent said inlet which is of a smaller diameter than a second part of said tubular portion located between said first part thereof and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having a helical edge of an outside diameter substantially equal to the inside diameter of said portion; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being located in said second part of said tubular housing at the place where said first part of said tubular portion joins said second part thereof; conduit means having one end connected to said housing, communicating with the interior of said portion thereof, and being adapted to be connected to a suction means whereby a partial vacuum may be produced in said portion of said housing; and screening means disposed at said end of said conduit means for blocking the passage of paste from said portion into said conduit means, said screening means being substantially flush with the inside surface of said portion so that as the worm screw rotates said helical edge thereof cleans said screening means.

11. Apparatus for treating alimentary pastes and the like comprising, in combination, a housing having an inlet and an outlet for feeding an alimentary paste respectively into and out of said housing, the latter having an elongated tubular portion located between said inlet and outlet, said tubular portion having a first part located adjacent said inlet which is of a smaller diameter than a second part of said tubular portion located between said first part thereof and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, said worm screw having in said second part of said tubular portion a helical edge of an outside diameter larger than in said first part thereof; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being located in said second part of said tubular housing at the place where said first part of said tubular portion joins said second part thereof; conduit means having one end connected to said housing in communication with the interior of said second part of said portion thereof and being adapted to be connected to a suction means whereby a partial vacuum may be produced in said second part of said portion; and screening means disposed at said end of said conduit means for blocking the passage of paste from said second part of said portion into said conduit means, said screening means being substantially flush with the inside surface of said second part of said portion so that as said worm screw rotates said helical edge thereof in said second part of said portion means cleans said screening means.

12. Apparatus for treating alimentary pastes and the like comprising, in combination, a housing having an inlet and an outlet for feeding an alimentary paste respectively into and out of said housing, the latter having an elongated tubular portion located between said inlet and outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing; a perforated disc located in said tubular portion of said housing about said worm screw between said inlet and outlet of said housing and extending across the interior of said tubular portion of said housing so that said worm screw feeds paste from said inlet through the perforations of said disc toward said outlet, the paste together with said disc serving to close off a portion of said housing located between said outlet and disc, the latter being fixed to and stationary with said housing and extending freely about said worm screw so that the latter is rotatable with respect to said disc, and the latter having the side thereof directed toward said outlet of said housing located against the thread of said worm screw so that paste passing through said disc is separated from the latter and broken up by said thread; and a conduit having one end connected to said housing, communicating with the interior of said portion thereof, and being adapted to be connected to a suction means whereby a partial vacuum may be produced in said portion.

13. Apparatus for treating alimentary pastes and the like, comprising, in combination, a housing having an inlet and an outlet for feeding an alimentary paste respectively into and out of said housing, the latter having an elongated tubular portion located between said inlet and said outlet, said tubular portion having a first part located adjacent said inlet and a second part located between said first part and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, the part of said worm screw extending within said second part of said tubular portion having an outside diameter substantially equal to the inside diameter of said second part of said tubular portion; a perforated disc located in said tubular portion of said housing about said worm screw between said inlet and said outlet of said housing and extending across the interior of said tubular portion of said housing so that said worm screw feeds paste from said inlet through the perforations of said disc toward said outlet, the paste together with said disc serving to close off said second part of said tubular portion, said disc being located in said second part of said tubular portion at the place where said first part of said tubular portion joins said second part thereof, said disc being fixed to and stationary with said housing and extending freely about said worm screw so that the latter is rotatable with respect to said disc, and the disc having the side thereof directed toward said outlet of said housing located against the thread of said part of said worm screw extending within said second part of said tubular portion so that paste passing through said disc is separated from the latter and broken up by the thread of said part of said worm screw extending within said second part of said tubular portion; and conduit means having one end connected to said housing, communicating with the interior of said second part of said tubular portion thereof at a place adjacent said perforated disc, and being adapted to be connected to suction means whereby a partial vacuum may be produced in said second part of said tubular portion.

14. Apparatus for treating alimentary pastes and the like, comprising, in combination, a housing having an inlet and an outlet for feeding an alimentary paste respectively into and out of said housing, the latter having an elongated tubular portion located between said inlet and said outlet, said tubular portion having a first part located adjacent said inlet and a second part located between said first part and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, the part of said worm screw extending within said second part of said tubular portion having an outside diameter substantially equal to the inside diameter of said second part of said tubular portion; a perforated disc located in said tubular portion of said housing about said worm screw between said inlet and said outlet of said housing and extending across the interior of said tubular portion of said housing so that said worm screw feeds paste from said inlet through the perforations of said disc toward said outlet, the paste together with said disc serving to close off said second part of said tubular portion, said disc being located in said second part of said tubular portion at the place where said first part of said tubular portion joins said second part thereof; means located against said disc for separating said paste therefrom as paste passes through said disc and for breaking up said paste after the latter has passed through said disc; and conduit means having one end connected to said housing, communicating with the interior of said second part of said tubular portion thereof at a place adjacent said perforated disc, and being adapted to be connected to suction means whereby a partial vacuum may be produced in said second part of said tubular portion.

15. Apparatus for treating alimentary pastes and the like, comprising, in combination, a housing having an inlet and an outlet for feeding an alimentary paste respectively into and out of said housing, the latter having an elongated tubular portion located between said inlet and said outlet, said tubular portion having a first part located adjacent said inlet and a second part located between said first part and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, the part of said worm screw extending within said second part of said tubular portion having an outside diameter substantially equal to the inside diameter of said second part of said tubular portion; a perforated disc located in said tubular portion of said housing about said worm screw between said inlet and said outlet of said housing and extending across the interior of said tubular portion of said housing so that said worm screw feeds paste from said inlet through the perforations of said disc toward said outlet, the paste together with said disc serving to close off said second part of said tubular portion, said disc being located in said second part of said tubular portion at the place where said first part of said tubular portion joins said second part thereof; means located against said disc and formed by the portion of said worm screw nearest said disc for separating said paste from said disc as said paste passes through said disc and for breaking up said paste after the latter has passed through said disc; and conduit means having one end connected to said housing, communicating with the interior of said second part of said tubular portion thereof at a place adjacent said perforated disc, and being adapted to be connected to suction means whereby a partial vacuum may be produced in said second part of said tubular portion.

16. In an apparatus for treating alimentary pastes and the like, in combination, a tubular housing having an inlet and an outlet for feeding an alimentary paste respectively into and out of said housing, said housing having an elongated tubular portion located between said inlet and said outlet; a worm screw turnably mounted in said tubular portion and extending from said inlet toward said outlet for feeding a paste from said inlet to said outlet, said worm screw having a helical edge of an outside diameter substantially equal to the inside diameter of said tubular portion; conduit means having one end connected to said housing, communicating with the interior of said tubular portion thereof, and being adapted to be connected to suction means whereby a partial vacuum may be produced within the interior of said tubular portion; and screening means disposed at said one end of said conduit means for blocking the passage of paste from said tubular portion into said conduit means, said screening means being substantially flush with the inside surface of said tubular portion so that as the worm screw rotates said helical edge thereof cleans said screening means.

17. Apparatus for treating alimentary pastes and the like, comprising, in combination, a housing having an inlet and an outlet for feeding an alimentary paste respectively into and out of said housing, the latter having an elongated tubular portion located between said inlet and said outlet, said tubular portion having a first part located adjacent said inlet and a second part located between said first part and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, the part of said worm screw extending within said second part of said tubular portion having a helical edge of an outside diameter substantially equal to the inside diameter of said second part of said tubular portion; a perforated disc located in said tubular portion of said housing about said worm screw between said inlet and said outlet of said housing and extending across the interior of said tubular portion of said housing so that said worm screw feeds paste from said inlet through the perforations of said disc toward said outlet, the paste together with said disc serving to close off said second part of said tubular portion, said disc being located in said second part of said tubular portion at the place where said first part of said tubular portion joins said second part thereof; means for separating said paste from said part thereof; means for separating said paste from said disc as said paste passes through said disc and for breaking up said paste after the latter has passed through said disc; conduit means having one end connected to said housing, communicating with the interior of said second part of said tubular portion thereof at a place adjacent said perforated disc, and being adapted to be connected to suction means whereby a partial vacuum may be produced in said second part of said tubular portion; and screening means disposed at said end of said conduit means for blocking the passage of paste from said second part of said tubular portion of said housing into said conduit means, said screening means being substantially flush with the inside surface of said second part of said tubular portion so that as said part of said worm screw extending within said second part of said tubular portion rotates said helical edge of said worm screw cleans said screening means.

18. Apparatus for treating alimentary pastes and the like, comprising, in combination, a housing having an inlet and an outlet for feeding an alimentary paste respectively into and out of said housing, the latter having an elongated tubular portion located between said inlet and said outlet, said tubular portion having a first part located adjacent said inlet and a second part located between said first part and said outlet; plate means covering said outlet of said housing for converting a paste passing through said plate means into elongated cord-like portions, said paste together with said plate means serving to close said outlet of said housing; a worm screw turnably mounted in said tubular portion of said housing and extending from said inlet toward said outlet for feeding a paste from said inlet to said outlet of said housing, the part of said worm screw extending within said second part of said tubular portion having a helical edge of an outside diameter substantially equal to the inside diameter of said second part of said tubular portion; a perforated disc located in said tubular portion of said housing about said worm screw between said inlet and said outlet of said housing and extending across the interior of said tubular portion of said housing so that said worm screw feeds paste from said inlet through the perforations of said disc toward said outlet, the paste together with said disc serving to close off said second part of said tubular portion, said disc being located in said second part of said tubular portion at the place where said first part of said tubular portion joins said second part thereof, said disc being fixed to and stationary with said housing and extending freely about said worm screw so that the latter is rotatable with respect to said disc, and the disc having the side thereof directed toward said outlet of said housing located against the thread of said part of said worm screw extending within said second part of said tubular portion so that paste passing through said disc is separated from the latter and broken up by the thread of said part of said worm screw extending within said second part of said tubular portion; conduit means having one end connected to said housing, communicating with the interior of said second part of said tubular portion thereof at a place adjacent said perforated disc, and being adapted to be connected to suction means whereby a partial vacuum may be produced in said second part of said tubular portion; and screening means disposed at said end of said conduit means for blocking the passage of paste from said second part of said tubular portion of said housing into said conduit means, said screening means being substantially flush with the inside surface of said second part of said tubular portion so that as said part of said worm screw extending within said second part of said tubular portion rotates said helical edge of said worm screw cleans said screening means.

References Cited in the file of this patent

UNITED STATES PATENTS

| | | |
|---|---|---|
| 523,116 | Gelinck | July 17, 1894 |
| 1,283,947 | Steinle | Nov. 5, 1918 |
| 2,078,565 | Durst et al. | Apr. 27, 1937 |
| 2,261,977 | Deutsch | Nov. 11, 1941 |
| 2,378,539 | Dawihl | June 19, 1945 |

FOREIGN PATENTS

| | | |
|---|---|---|
| 568,094 | Great Britain | Mar. 8, 1944 |